United States Patent [19]

Grover

[11] 4,041,996
[45] Aug. 16, 1977

[54] STUMP ERADICATOR
[75] Inventor: Ross D. Grover, Crystal, Mich.
[73] Assignee: Ram Industries, Inc., Northville, Mich.
[21] Appl. No.: 585,459
[22] Filed: June 10, 1975
[51] Int. Cl.² .............................................. A01G 23/08
[52] U.S. Cl. ..................................... 144/2 N; 37/2 R; 144/218; 144/236; 144/237; 241/101.7; 241/292.1
[58] Field of Search ................... 37/2 R, 189, 190, 94; 144/2 N, 218, 231, 236, 237; 241/292.1, 294, 101.7, 186 A, 191; 83/928, 698

[56] References Cited
U.S. PATENT DOCUMENTS

| 346,681 | 8/1886 | Perry | 144/237 |
| 564,747 | 7/1896 | Gutenkunst | 241/292.1 X |
| 578,234 | 3/1897 | Gutenkunst | 241/292.1 |
| 3,018,972 | 1/1962 | Steinmetz | 241/191 X |
| 3,868,980 | 3/1975 | Blum | 144/2 N |

Primary Examiner—Othell M. Simpson
Assistant Examiner—W. D. Bray
Attorney, Agent, or Firm—Whittemore, Hulbert & Belknap

[57] ABSTRACT

Apparatus for eradicating tree stumps comprising a rotary cylinder or drum having knives or cutters around its periphery. The cutters are mounted on rings which encircle the drum. The rings have circumferentially spaced mounting surfaces which are staggered relative to one another so that the cutters when secured to the mounting surfaces are themselves staggered for more effective cutting action. The drum is supported by two rotary hydraulic and/or electric motors having aligned output shafts which are connected to the ends of the drum to support and also to rotate it. The motors are carried by the arms of a yoke. Instead of two motors, there may be a motor at one end of the drum and a bearing at the other.

4 Claims, 5 Drawing Figures

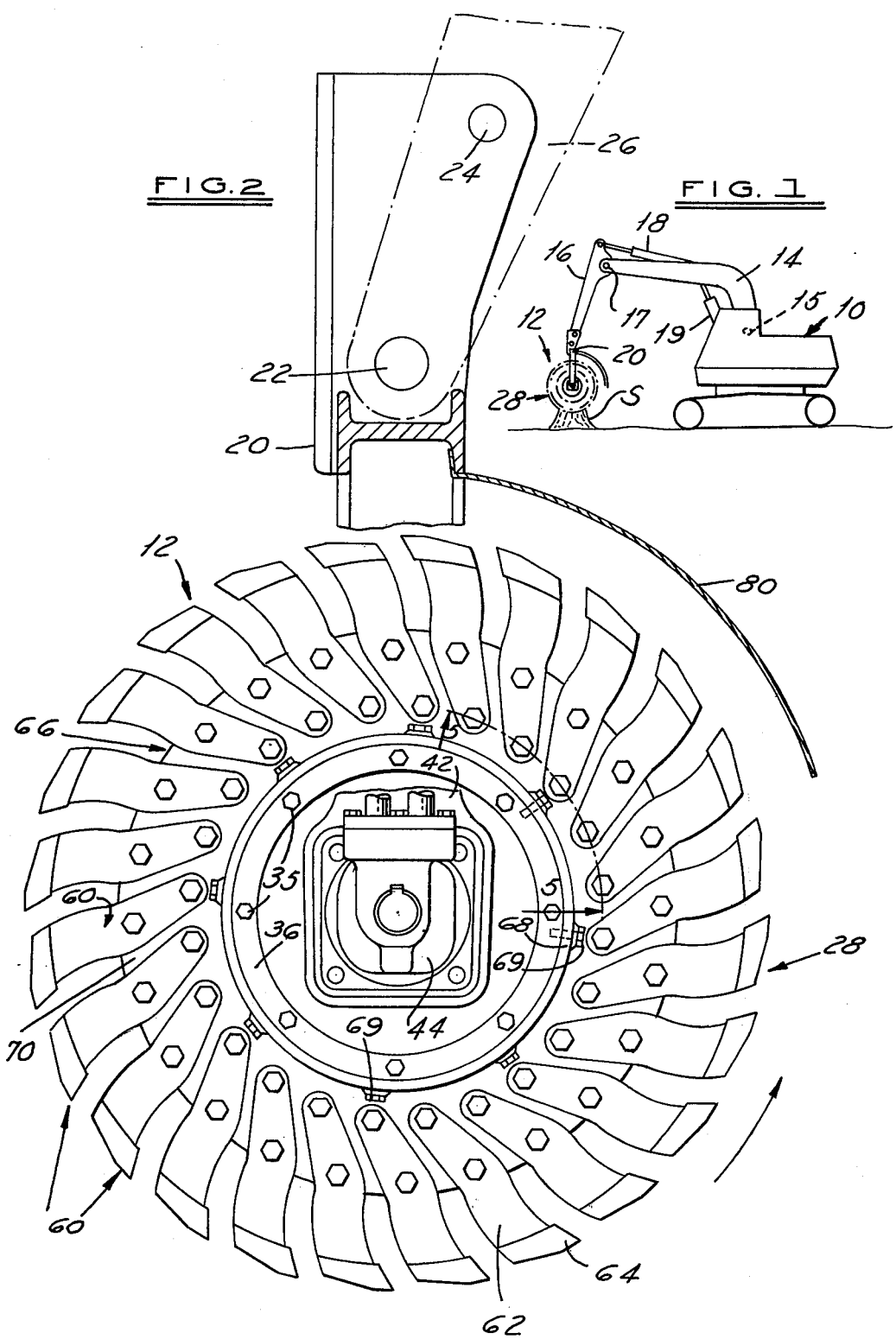

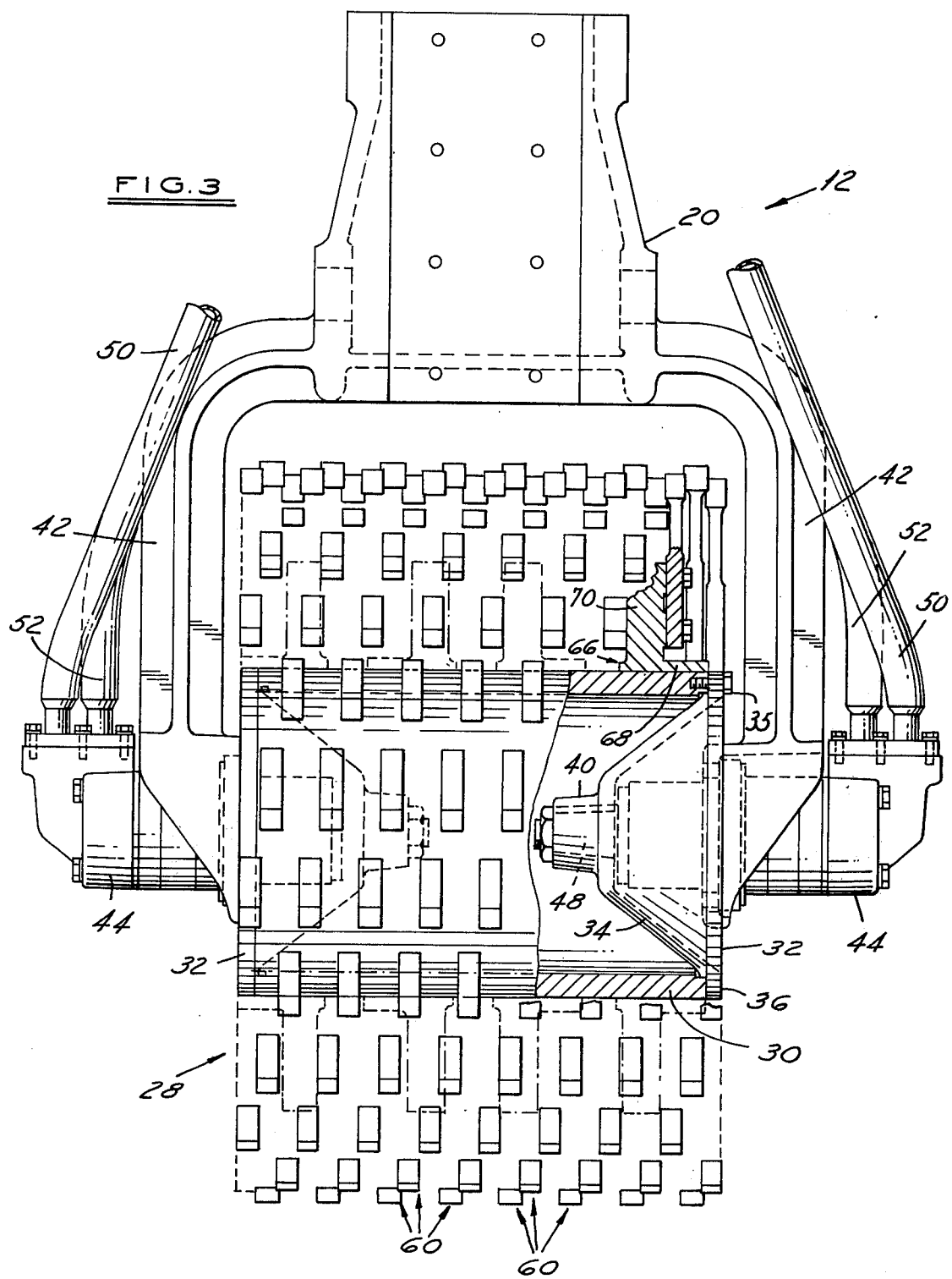

STUMP ERADICATOR

SUMMARY OF THE INVENTION

This invention has for a principal object to provide an improved apparatus for clearing tree stumps by cutting or pulverizing them down to a level below the surface of the ground. The apparatus may also be used to clear a field of small trees, roots and all underbrush existing at or near ground level.

A more specific object of the invention is to provide an improved apparatus which is relatively easy to maintain and virtually trouble-free in operation.

One stump eradicating machine presently in use has been found to foul up very easily when operated. It has a power-driven chain carrying cutters over a disc. Dirt gets into the chain and between the chain and disc when the machine is operated resulting in frequent breakdowns. Sudden stops break the chain and rocks break cutters. The apparatus of my invention as stated is designed to prevent all dirt and foreign matter from getting into the moving parts during use so that machine breakdown time is not a problem.

Another object of the invention is to provide an improved arrangement of cutting elements for more effective cutting and pulverizing action.

Other objects and advantages of the invention will become more apparent as the description proceeds, especially when taken in conjunction with the accompanying drawings, wherein:

FIG. 1 is a semi-diagrammatic side elevational view on a reduced scale showing the stump eradicating apparatus of my invention mounted upon a typical vehicle suitable for the purpose.

FIG. 2 is a side elevational view of a portion of FIG. 1, showing the apparatus on an enlarged scale.

FIG. 3 is a front elevation of the structure shown in FIG. 2 with parts broken away and in section.

Figure 5:
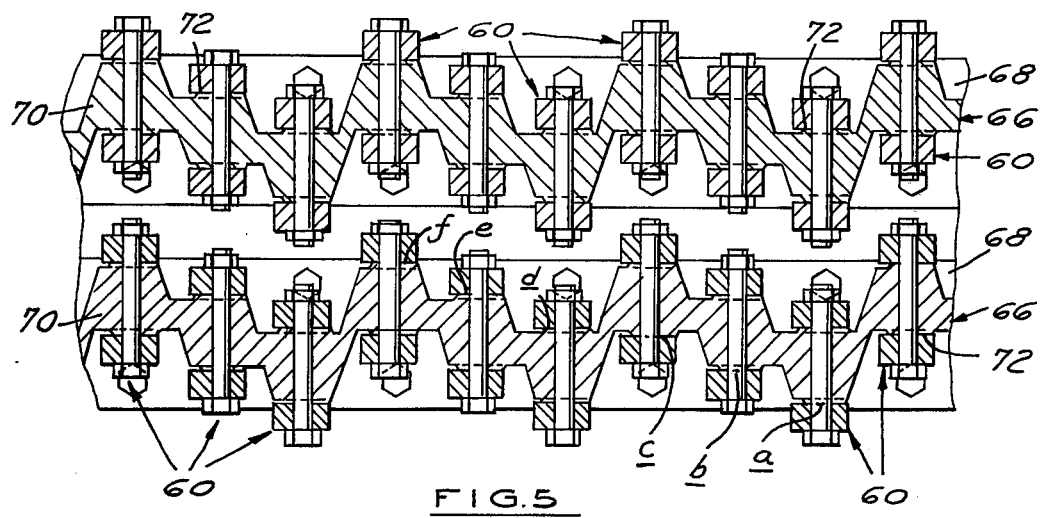
FIG. 5 is a development taken substantially on the line 5—5 of FIG. 2.
Figure 4:
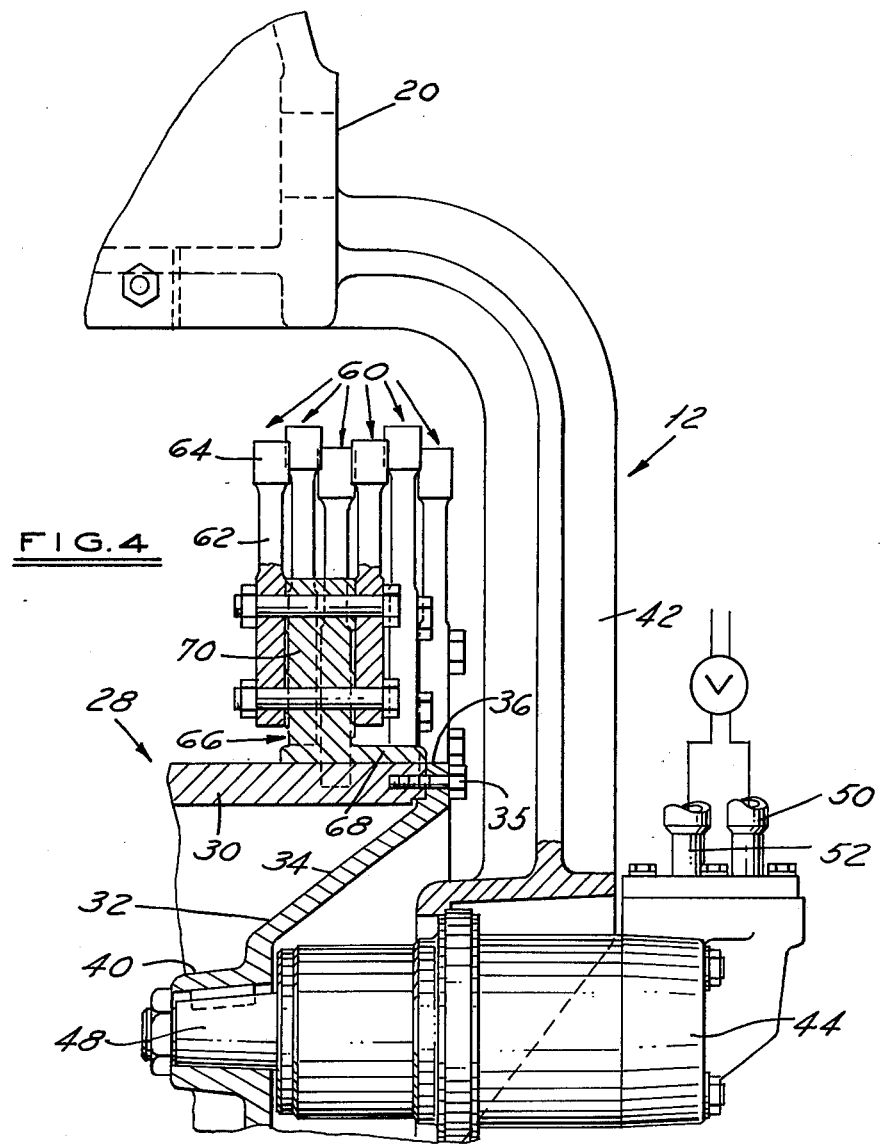
FIG. 4 is an enlarged sectional view showing a portion of FIG. 3.

Referring now more particularly to the drawings, there is shown a typical motor vehicle, in this instance a caterpillar type tractor 10 with electric or hydraulic capacity, upon which the stump eradicating apparatus 12 of this invention is mounted. A wheeled vehicle or trailer may be used instead of a tractor. The tractor 10 has a boom 14 which may be raised and lowered about pivot 15 by cylinder assembly 19. An arm 16 is pivoted at 17 to boom 14 for fore and aft movement by the cylinder assembly 18. The apparatus 12 includes a supporting yoke 20 which is secured to the lower end of the arm 16 by pins 22 and 24. The apparatus 12 is easily mounted on the arm 16 which is part of the original vehicle 10 without machining any parts, only adding on. The mounting of the stump eradicating apparatus 12 on the vehicle 10 makes the apparatus portable and capable of being self- propelled or moved to any accessible location in a field where a stump S needs to be cleared.

The stump eradicating apparatus 12 includes in addition to the yoke 20 a cylindrical cutting assembly 28. The cutting assembly 28 may be of any suitable length and preferably is longer than the average diameter of stumps likely to be eradicated by this apparatus. The cutting assembly 28 has a hollow cylinder or drum 30 which is open ended and of uniform circular cross section throughout its length. The ends of the drum 30 are completely closed by the frusto-conical or recessed end caps 32. Each end cap 32 has a frusto-conical section 34 which extends into the cylinder and has a laterally outwardly extending terminal flange 36 at the large end that is bolted to the end of drum 30 by fasteners 35. Each end cap 32 has a tubular extension 40 at the small end of the frusto-conical section 34 which is aligned with the axis of the drum 30.

The yoke 20 for supporting the cutting assembly 28 has a pair of yoke arms 42 which straddle the same. A rotary motor 44 is rigidly secured to the end of each yoke arm 42. In this instance, these motors are hydraulic but they could also be electric. As noted above, instead of two motors, a single motor with gear reduction may be provided for one end of the drum and a bearing for the other. Motors 44 will be seen to be aligned with one another and each has an output shaft 48 at the inner end projecting from the motor housing and keyed to the tubular cap extension 40 as shown. These output shafts 48 are of course aligned with one another on the central axis of rotation of the drum 30. The motors 44 have sealed housings and project into the cupped or recessed end caps 32 and the frusto-conical walls or sections 34 closely surround the motors. The motor shafts are sealed within the motor and the shafts and inner ends of the motor are protected from dirt and foreign matter by extending within the cup-shaped caps inwardly of the drum ends. Hydraulic lines 50 and 52 lead to each of the motors 44 for carrying hydraulic fluid to and from the motors to rotate the drum. As noted above, the motors may be electric instead of hydraulic. No special power system is ordinarily required to operate the motors 44 since the one provided on the vehicle or tractor 10 may be used. In fact, it is preferred to make use of the system on the tractor for this purpose.

A reversing valve V is provided in the hydraulic lines 50 and 52. This valve is diagrammatically shown and may be of any suitable construction. It is provided so that the motors may be operated to drive the cutting assembly 28 in either direction. Normal rotation is in the direction of the arrow in FIG. 2.

The cutting assembly 28 is provided with a plurality of knives or cutting elements 60 of identical construction arranged over the periphery of the drum 30 to do the actual cutting and pulverizing of the stump. These cutters are of the construction shown in the drawings, having the shank portions 62 and the cutting heads 64. The cutters 60 are mounted on the drum periphery by being secured to rings 66 which encircle the drum. The rings 66 extend circumferentially about the surface of the drum 30 in concentric relation to the drum axis and in axially spaced relation to one another. Each ring includes a base portion 68 in the form of a board band which encircles the drum 30 in surface-to-surface relation therewith and is secured thereto by the fasteners 69. Each ring also includes a circumferentially extending mounting portion 70 integral with the band 68 and projecting radially outwardly therefrom.

The mounting portion 70 has a series of cutter mounting surfaces 72 on each side, which surfaces are circumferentially spaced from one another all around the drum and lie in planes disposed at right angles to the central axis of the drum. The series of surfaces on one side of the mounting portion 70 are arranged in successive groups of three axially displaced or staggered surfaces *a*, *b*, and *c*. All of the surfaces *a* are disposed in a common plane, as are all of the surfaces *b* and all of the surfaces *c*. The series of surfaces on the other side of the mounting portion 70 are arranged in successive groups of three staggered surfaces d, e and f. All of the surfaces d are disposed in a common plane, as are all of the surfaces e and all of the surfaces f. The surfaces a, b and c on one side of the mounting portion 70 are directly opposite the surfaces d, e and f on the opposite side thereof.

One cutting element is mounted on each mounting surface, its shank being bolted thereto in surface-to-surface relation thereto and projecting in a generally radially outward direction. In accordance with this construction, when a development of the drum surface with the cutters mounted thereon is made, as in FIG. 5, the cutters mounted on the surfaces a, b and c of each group are staggered so as to be aligned with one another at an acute angle to the length of the ring, and are also aligned with the staggered cutters on the opposite side of the mounting portion secured to the mounting surfaces d, e and f in the next succeeding group. The construction and rotative positioning of the rings is such that the lines of cutters a–f on adjacent rings fall into line and are disposed in helical alignment around the circumference of the drum. Obviously, other means for mounting the cutters so as to provide a staggered relationship may be employed, but the present construction provides a superior means of achieving the purpose. A staggered relationship of the cutters as shown provides a more effective cutting action and distributes the load on the power supply more evenly to provide a more continuous and less intermittent cutting pressure.

A guard 80 secured to yoke 20 extends over the drum as a shield against cuttings.

In use, the vehicle 10 is self-propelled to a position adjacent the spot where the apparatus 12 is to be operated. Motors 44 are driven to rotate the cutting assembly 28 in the direction of the arrow in FIG. 2. The boom 14 is lowered by cylinder 19 to lower the cutting assembly 28. The cutting assembly may be brought down in engagement with the top of the stump and continued downward pressure causes the rotary cutters to cut away and pulverize the stump down to a level below the surface of the ground. The stump may also be eradicated by bringing the cutting assembly 28 down to near ground level either fore or aft of the stump and then pivoting arm 16 by operation of cylinder 18 to swing the cutting assembly fore or aft across the trunk. The length of the drum is such that it exceeds the diameter of most tree stumps so that a single pass is all that usually is needed. As stated above, the apparatus may also be used to clear a field of roots, etc., and for this purpose may be operated while the vehicle is in motion.

What I claim as my invention is:

1. Apparatus for eradicating tree stumps and the like, comprising a frame adapted to be mounted on a vehicle, a yoke on said frame having spaced arms, a cylindrical drum disposed between said arms and having cutting elements on the periphery thereof, a motor carried by one of said arms, said motor having an output shaft in axial alignment with the axis of rotation of said drum and directly connected to one end of said drum on its axis of rotation, said motor and its output shaft serving to mount said one end of said drum on said one arm of said yoke and also serving as a means to rotate said drum, and means rotatably mounting the other end of said drum on the other arm of said yoke.

2. The apparatus set forth in claim 1, werein said one end of said drum has a recessed portion concentric with its axis of rotation, said output shaft and at least a portion of said motor extending concenrically into said recessed portion.

3. The apparatus set forth in claim 1, wherein said means rotatably mounting said other end of said drum on said other arm of said yoke comprises a second motor carried by said other arm, said second motor having a second output shaft in axial alignment with the axis of rotation of said drum and directly connected to said other end of said drum on its axis of rotation, said motor and its output shaft serving to mount said other end of said drum on said other arm of said yoke and also serving as a means to rotate said drum.

4. The apparatus set forth in claim 3, wherein each end of said drum has a recessed portion concentric with its axis of rotation, said output shafts and at least a portion of said motors extending concentrically into said recessed portions.

* * * * *